(12) United States Patent
Gurumoorthy et al.

(10) Patent No.: US 12,022,135 B2
(45) Date of Patent: Jun. 25, 2024

(54) METHOD AND SYSTEM FOR PROVIDING MEDIA CONTENT TO IN-FLIGHT WIRELESS MEDIA SERVERS

(71) Applicant: HCL Technologies Limited, New Delhi (IN)

(72) Inventors: Sathish Gurumoorthy, Chennai (IN); Shrihari K, Bangalore (IN); Ganesh S, Chennai (IN)

(73) Assignee: HCL TECHNOLOGIES LIMITED, New Delhi (IN)

( * ) Notice: Subject to any disclaimer, the term of this patent is extended or adjusted under 35 U.S.C. 154(b) by 27 days.

(21) Appl. No.: 17/983,405

(22) Filed: Nov. 9, 2022

(65) Prior Publication Data

US 2024/0089512 A1  Mar. 14, 2024

(30) Foreign Application Priority Data

Sep. 9, 2022  (IN) .............................. 202211051645

(51) Int. Cl.
*H04N 21/214* (2011.01)
*H04N 21/231* (2011.01)
(52) U.S. Cl.
CPC ... *H04N 21/2146* (2013.01); *H04N 21/23116* (2013.01)
(58) Field of Classification Search
CPC .............. H04N 21/2146; H04N 21/23116
See application file for complete search history.

(56) References Cited

U.S. PATENT DOCUMENTS

| | | | |
|---|---|---|---|
| 6,810,527 B1 | 10/2004 | Conrad et al. | |
| 7,177,939 B2 | 2/2007 | Nelson et al. | |
| 9,083,581 B1 | 7/2015 | Addepalli et al. | |
| 9,509,937 B2 * | 11/2016 | Easterling | ........ H04N 21/43615 |
| 10,595,052 B1 | 3/2020 | Worley, III | |
| 2021/0315055 A1 | 10/2021 | Lauer | |

FOREIGN PATENT DOCUMENTS

| | | |
|---|---|---|
| ES | 2773654 T3 | 7/2020 |
| WO | 2009036391 A2 | 3/2009 |

* cited by examiner

*Primary Examiner* — Nicholas T Corbo (57) ABSTRACT

A method for transmitting media content from a cloud content delivery network (CCDN) to a plurality of in-flight wireless media servers (WMSs) is disclosed. In some embodiments, the method includes receiving, by each of the plurality of in-flight WMSs, position data with respect to at least one of a movement, an altitude, or a geo-spatial location of an aircraft; identifying, by the plurality of in-flight WMSs, one or more elevated in-flight WMSs for receiving the media content. The method for identifying further includes determining a respective content-reception state of each of the plurality of in-flight WMSs; determining a respective content-reception suitability score for each of the plurality of in-flight WMSs; and identifying the one or more elevated in-flight WMSs. The method further includes receiving, by each of the one or more elevated in-flights WMSs, the media content from a suitable CCDN server in the CCDN.

20 Claims, 6 Drawing Sheets

```
┌─────────────────────────────────────────────────────────────┐
│  Receive, by each of the plurality of in-flight WMSs        │
│  communicatively coupled to an in-flight network, a         │
│  positioning of an aircraft from one or more in-flight      │
│  positioning 302                                            │
└─────────────────────────────────────────────────────────────┘
                              │
                              ▼
┌─────────────────────────────────────────────────────────────┐
│  Identify, by the plurality of in-flight WMSs, one or more  │
│  elevated in-flight WMSs for receiving the media content    │
│  from the CCDN 304                                          │
│  ┌───────────────────────────────────────────────────────┐  │
│  │ Determine, by each of the plurality of in-flight      │  │
│  │ WMSs, a respective content-reception state of each    │  │
│  │ of the plurality of in-flight WMSs 306                │  │
│  └───────────────────────────────────────────────────────┘  │
│  ┌───────────────────────────────────────────────────────┐  │
│  │ Determine, by each of the plurality of in-flight WMSs │  │
│  │ and upon determining a positive content-reception     │  │
│  │ state, a respective content-reception suitability     │  │
│  │ score 308                                             │  │
│  └───────────────────────────────────────────────────────┘  │
│  ┌───────────────────────────────────────────────────────┐  │
│  │ Identify, by the plurality of in-flight WMSs, the one │  │
│  │ or more elevated in-flight WMSs 310                   │  │
│  └───────────────────────────────────────────────────────┘  │
└─────────────────────────────────────────────────────────────┘
                              │
                              ▼
┌─────────────────────────────────────────────────────────────┐
│  Receive, by each of the one or more elevated in-flights    │
│  WMSs, the media content from a suitable CCDN server in     │
│  the CCDN 312                                               │
└─────────────────────────────────────────────────────────────┘
                              │
                              ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
   Transfer, by at least one of the one or more elevated
│  in-flight WMSs, the media content to one or more of the  │
   remaining in-flight WMSs over the in-flight network 314
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

METHOD AND SYSTEM FOR PROVIDING MEDIA CONTENT TO IN-FLIGHT WIRELESS MEDIA SERVERS

TECHNICAL FIELD

Generally, the invention relates to in-flight entertainment. More specifically, the invention relates to method and system for providing media content to in-flight wireless media servers.

BACKGROUND

As we are aware that the history of In-flight entertainment (IFE) system is as old as a commercial air travel. Airlines are continuously making an effort to implement new ways to enhance IFE for entertaining passengers. The IFE is a means for providing access of multimedia content to passenger in order to make travelling of passengers easier and more enjoyable. Currently, a significant change can be seen in the IFE since it was first introduced to commercial flights over a century ago. Further, with many advancements and cost optimization in airlines industries, people are preferring to travel by flight to save their time even for short haul, i.e., a duration of less than about 2-3 hours.

Most of the short haul flights are currently being handled by Low-Cost Carrier (LCC) & Ultra Low-Cost Carrier (ULCC) airlines. These short haul flights have traditionally avoided use of seat-centric in-flight entertainment system to reduce initial cost and increase operational efficiency. However, with rise of new connectivity technology and increased use of smartphones, the airlines have shifted their focus from use of seat centric in-flight entertainment system to bring your own device (BYOD), thereby enabling airlines to reduce cost in more than one way. With use of BYOD, i.e., a significantly less-weight entertainment system, the LCCs and ULCCs are looking simple and smart ways to digitally connect with passengers in order to enhance their travelling experience. Further, the rise in BYOD system and in-flight Wi-Fi network offers passengers with a viable option to enjoy a full catalogue of entertainment and digital media services content right at their fingertips and through their own devices. In order to provide a better viewing experience, the in-flight WMSs (i.e., passenger device) requires media content (for example: videos, music, DRM-protected contents, pdf magazines, duty free, F&B, and merchandise) to be synchronized often. In other words, there is a need for constant update to these media contents to engage passenger with relevant and better viewing experience.

Therefore, there is a need of implementing an efficient and reliable method and system for transmitting media content from a cloud content delivery network (CCDN) to a plurality of in-flight wireless media servers (WMSs) constantly in less available time and reliable connectivity with on-ground CCDN.

SUMMARY OF INVENTION

In one embodiment, a method for transmitting media content from a cloud content delivery network (CCDN) to a plurality of in-flight wireless media servers (WMSs) is disclosed. The method may include receiving, by each of the plurality of in-flight WMSs communicatively coupled to an in-flight network, position data with respect to at least one of a movement, an altitude, or a geo-spatial location of an aircraft from one or more in-flight sensors. The method may include identifying, by the plurality of in-flight WMSs, one or more elevated in-flight WMSs for receiving the media content from the CCDN. The method for identifying may further include determining, by each of the plurality of in-flight WMSs, a respective content-reception state of each of the plurality of in-flight WMSs based on the position data. The method for identifying may further include determining, by each of the plurality of in-flight WMSs and upon determining a positive content-reception state, a respective content-reception suitability score, using a first trained Machine Learning (ML) model, based on a set of network parameters conducive for a synchronization of the media content between the CCDN and the plurality of in-flight WMSs. The method for identifying may further include identifying, by the plurality of in-flight WMSs, the one or more elevated in-flight WMSs based on the respective content-reception suitability score of each of the plurality of in-flight WMSs. The method may further include receiving, by each of the one or more elevated in-flights WMSs, the media content from a suitable CCDN server in the CCDN upon establishing a wireless communication between the one or more elevated in-flights WMSs and the suitable CCDN server.

In another embodiment, a system for transmitting media content from a cloud content delivery network (CCDN) to a plurality of in-flight wireless media servers (WMSs) is disclosed. The system includes a processor and a memory communicatively coupled to the processor. The memory may store processor-executable instructions, which, on execution, may cause the processor to receive, by each of the plurality of in-flight WMSs communicatively coupled to an in-flight network, position data with respect to at least one of a movement, an altitude, or a geo-spatial location of an aircraft from one or more in-flight sensors. The processor-executable instructions, on execution, may further cause the processor to identify, by the plurality of in-flight WMSs, one or more elevated in-flight WMSs for receiving the media content from the CCDN. In addition, to identify one or more elevated in-flight WMSs, the processor-executable instruction may further cause the process to determine, by each of the plurality of in-flight WMSs, a respective content-reception state of each of the plurality of in-flight WMSs based on the position data. In order to identify one or more elevated in-flight WMSs, the processor-executable instruction may further cause the process to determine, by each of the plurality of in-flight WMSs and upon determining a positive content-reception state, a respective content-reception suitability score, using a first trained Machine Learning (ML) model, based on a set of network parameters conducive for a synchronization of the media content between the CCDN and the plurality of in-flight WMSs. In order to identify one or more elevated in-flight WMSs, the processor-executable instruction may further cause the process to identify, by the plurality of in-flight WMSs, the one or more elevated in-flight WMSs based on the respective content-reception suitability score of each of the plurality of in-flight WMSs. The processor-executable instructions, on execution, may further cause the processor to receive, by each of the one or more elevated in-flights WMSs, the media content from a suitable CCDN server in the CCDN upon establishing a wireless communication between the one or more elevated in-flights WMSs and the suitable CCDN server.

In yet another embodiment, a non-transitory computer-readable medium storing computer-executable instruction for transmitting media content from a cloud content delivery network (CCDN) to a plurality of in-flight wireless media servers (WMSs) is disclosed. The stored instructions, when executed by a processor, may cause the processor to perform operations including receiving, by each of the plurality of in-flight WMSs communicatively coupled to an in-flight network, position data with respect to at least one of a movement, an altitude, or a geo-spatial location of an aircraft from one or more in-flight sensors. The operations may further include identifying, by the plurality of in-flight WMSs, one or more elevated in-flight WMSs for receiving the media content from the CCDN. The operations for identifying one or more elevated in-flight WMSs may further include determining, by each of the plurality of in-flight WMSs, a respective content-reception state of each of the plurality of in-flight WMSs based on the position data. The operations for identifying one or more elevated in-flight WMSs may further include determining, by each of the plurality of in-flight WMSs and upon determining a positive content-reception state, a respective content-reception suitability score, using a first trained Machine Learning (ML) model, based on a set of network parameters conducive for a synchronization of the media content between the CCDN and the plurality of in-flight WMSs. The operations for identifying one or more elevated in-flight WMSs may further include identifying, by the plurality of in-flight WMSs, the one or more elevated in-flight WMSs based on the respective content-reception suitability score of each of the plurality of in-flight WMSs. The operations may further include receiving, by each of the one or more elevated in-flights WMSs, the media content from a suitable CCDN server in the CCDN upon establishing a wireless communication between the one or more elevated in-flights WMSs and the suitable CCDN server.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1A:
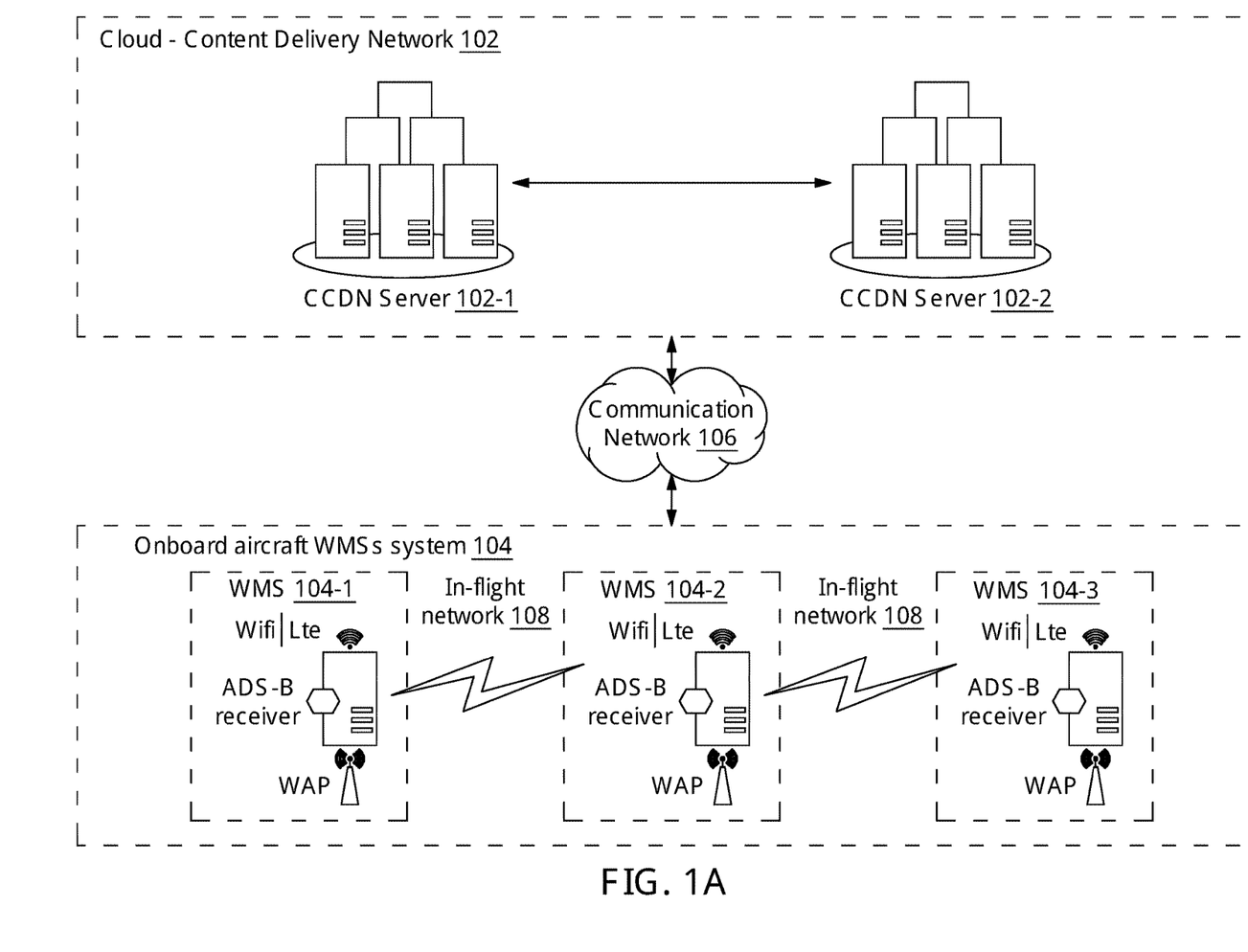
FIG. 1A-1B illustrates an environment diagram for transmitting media content from a cloud content delivery network (CCDN) to a plurality of in-flight wireless media servers (WMSs), in accordance with an embodiment.
Figure 1B:
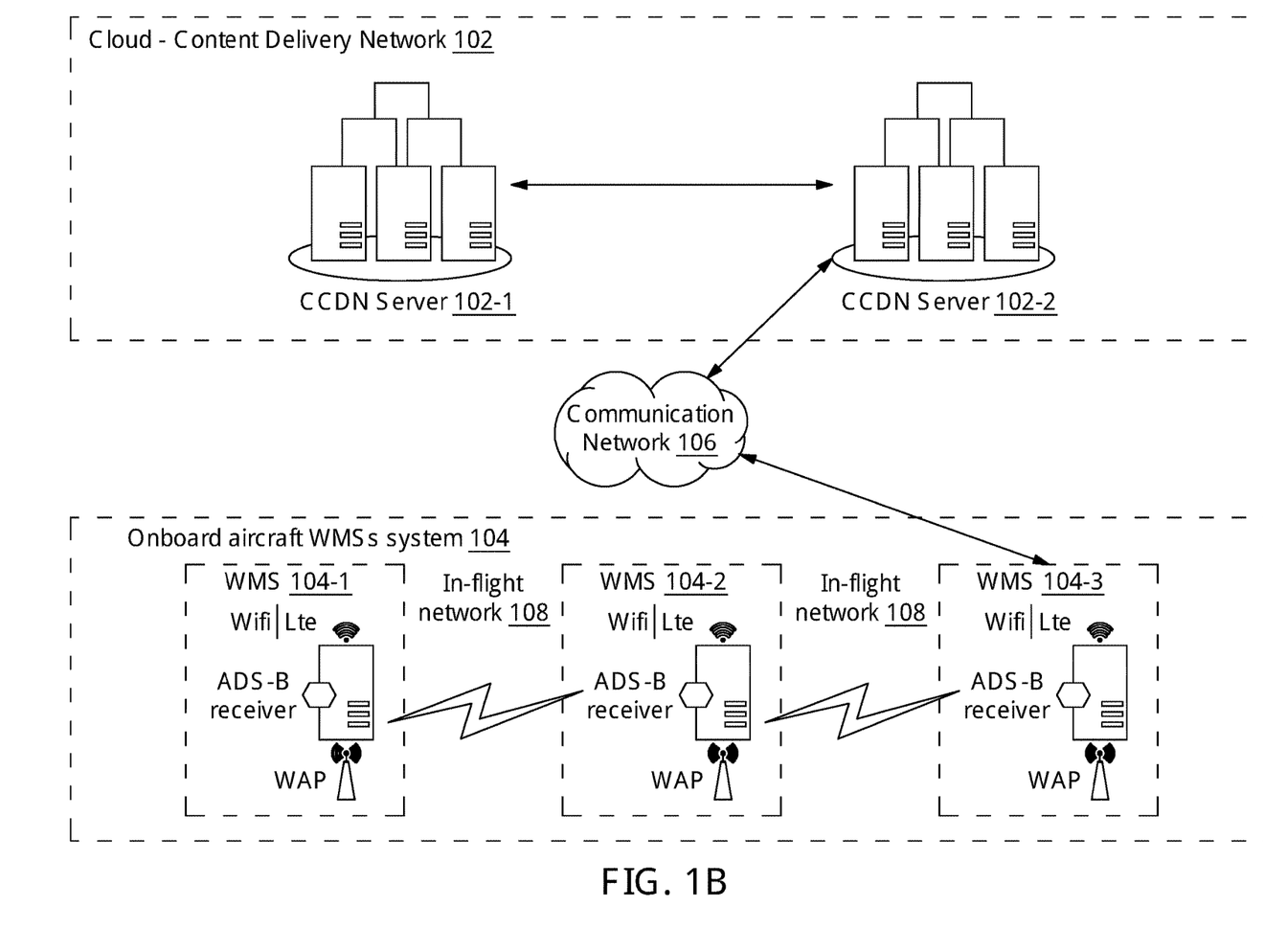

An environment diagram for transmitting media content from a cloud content delivery network (CCDN) to a plurality of in-flight wireless media servers (WMSs) is illustrated in FIG. 1A-1B, in accordance with an embodiment. FIG. 1 depicts an environment diagram comprising a CCDN 102 and an onboard aircraft WMSs system 104. In an embodiment, the onboard aircraft WMSs system 104 may include the plurality of in-flight WMSs. Further, as depicted via the FIG. 1A, the CCDN 102 may include a CCDN server 102-1 and a CCDN server 102-2. In addition, the plurality of in-flight WMSs may correspond to a WMS 104-1, a WMS 104-2, and a WMS 104-3. In an embodiment, each of the plurality of in-flight WMSs may be communicatively coupled to each other via an in-flight network 108. Moreover, as depicted via the FIG. 1A, each of the WMS 104-1, the WMS 104-2, and the WMS 104-3 may have a wireless access point (WAP), and an Automatic Dependent Surveillance-Broadcast (ADS-B) receiver.

Further, each of the WMS 104-1, the WMS 104-2, and the WMS 104-3 may interact with each other via Wi-Fi or Long-Term Evolution (LTE) using in-flight network. It should be noted that for ease of explanation two CCDN servers and three WMS are shown. However, number of CCDN servers may vary based on creation of the CCDN. In addition, number of in-flight WMSs may depend upon number of passengers travelling in an aircraft with an electronic device. Examples of the electronic device may include, but is not limited to, a smartphone, a laptop, and a tablet. In an embodiment, the electronic device may correspond to each of the plurality of in-flight WMSs. Further, the plurality of in-flight WMSs may interact with the CCDN 102 via a communication network 106. In an embodiment, the communication network 106 may be used for establishing a wireless communication between the plurality of in-flight WMSs and the CCDN 102. An exemplary environment diagram representing transmission of the media content from the CCDN 102 to one of the plurality of in-flight WMSs present in the onboard aircraft WMSs system 104 has been depicted via FIG. 4B.

Figure 4A:
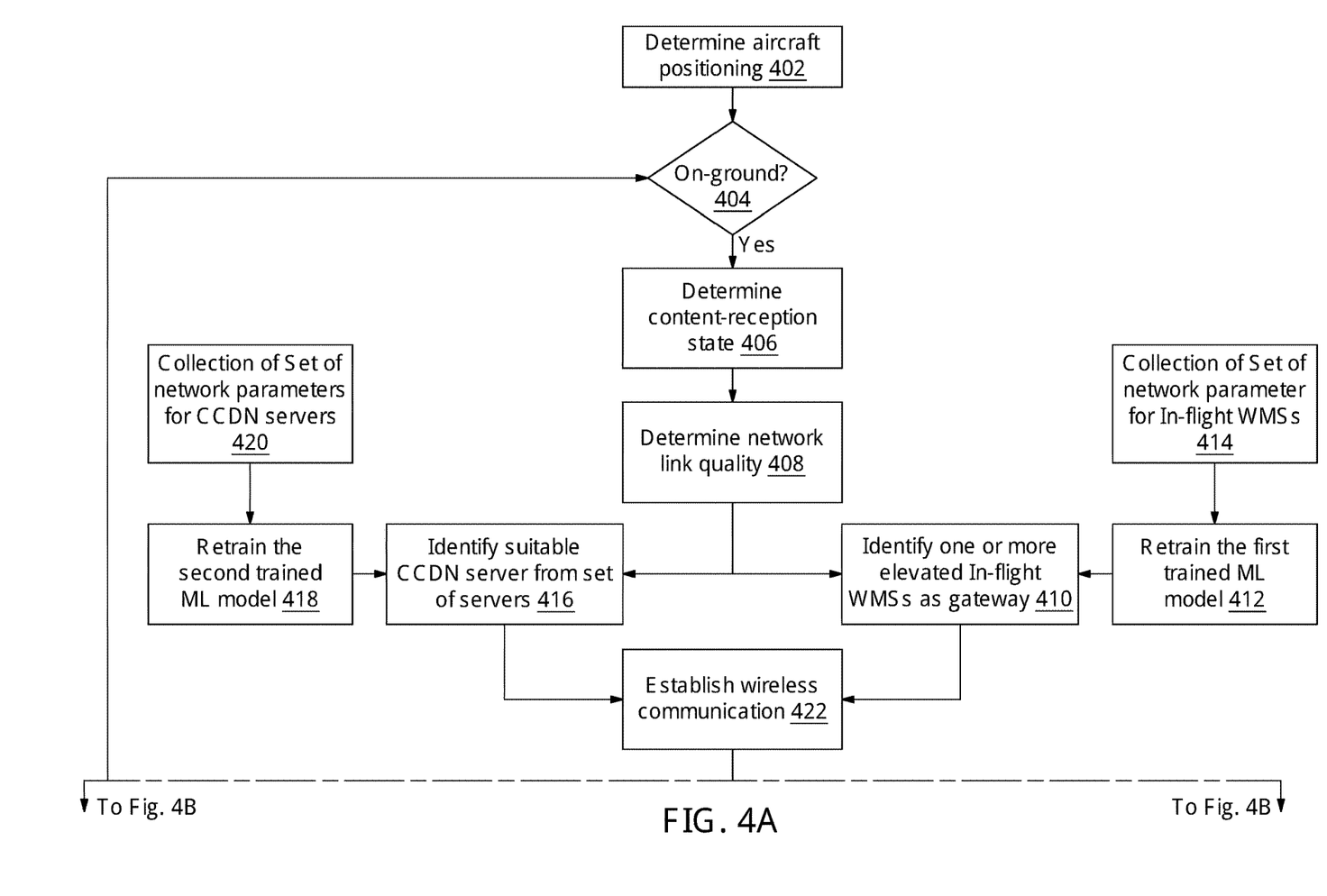
FIG. 4A-4B illustrates a detailed flowchart of a method for transmitting media content from a CCDN to a plurality of in-flight WMSs, in accordance with an embodiment.
Figure 4B:
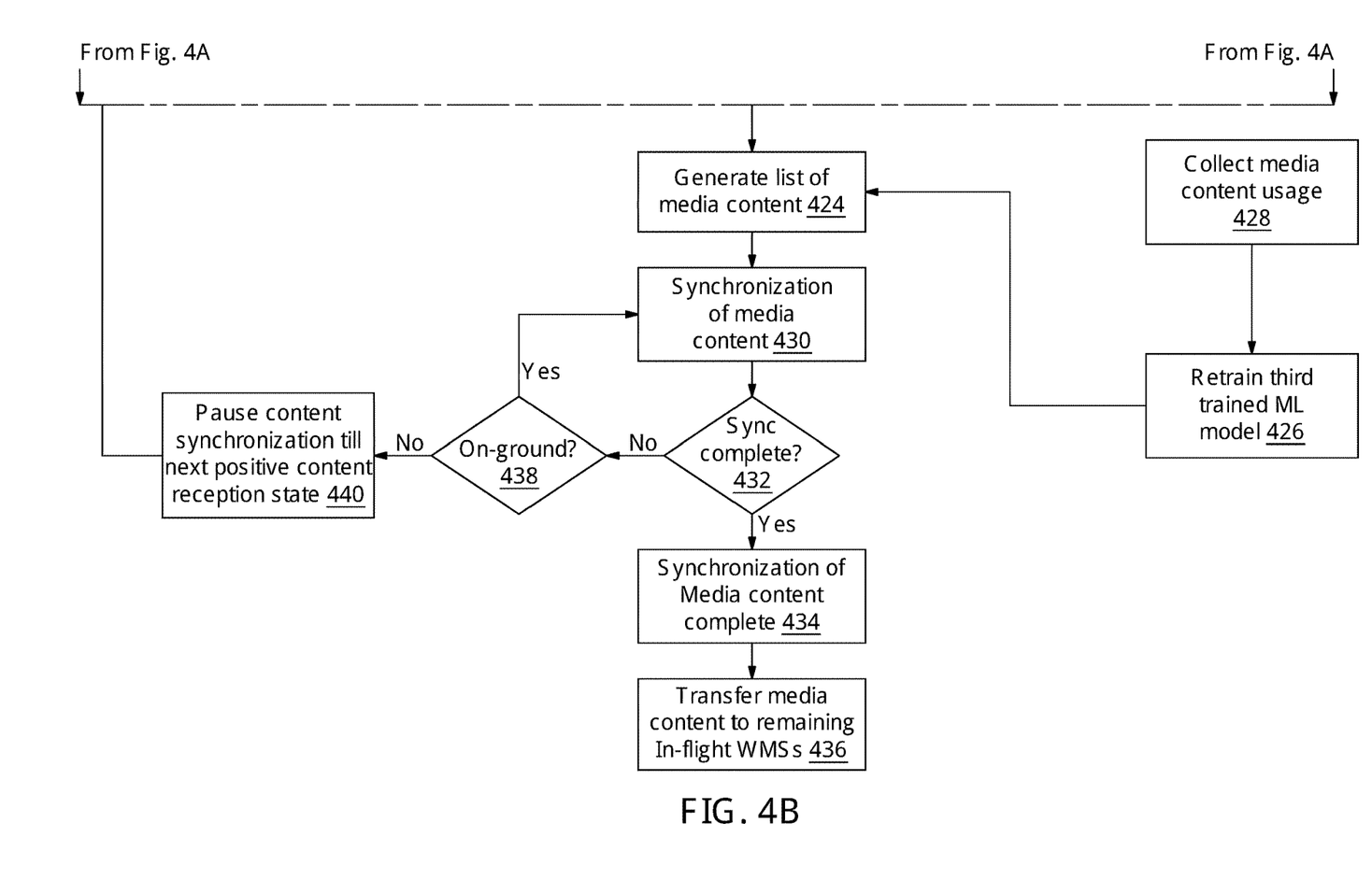

As represented via the FIG. 4B, initially, each of the WMS 104-1, the WMS 104-2, and the WMS 104-3 may receive position data of the aircraft from one or more in-flight sensors. The position data may be with respect to a movement of the aircraft, an altitude of the aircraft, and/or a geo-spatial location (i.e., latitude and longitude) of the aircraft. In addition, the one or more of in-flight sensors may include a set of primary sensors and a set of secondary sensors. Thus, each of the WMSs may receive the movement, the altitude, and/or the geo-spatial location of the aircraft from the set of primary sensors and/or the set of secondary sensors. By way of an example, the set of primary sensors may include ADS-B sensors, i.e., ADS-B receivers. Similarly, by way of an example, the set of secondary sensors may include Accelerometer, Gyroscope, Altimeter or Pressure sensor, and/or location sensor. The Accelerometer and Gyroscope may capture several samples (e.g., 70 samples) of their respective reading. The captured sample signals may be analyzed to detect the peak signals. In one embodiment, the peak signal may be detected as follows—if a new datapoint is a given x number of standard deviations away from some moving mean. It should be noted that, in some embodiments, the secondary sensors may be used for receiving position data with respect to the movement, the altitude and/or the geo-spatial location, if the primary sensor data is not available.

Upon receiving the position data, each of the WMS 104-1, the WMS 104-2, and the WMS 104-3 may identify one or more elevated in-flight WMSs for receiving the media content from the CCDN. In order to identify the one more elevated in-flight WMSs from each of the WMS 104-1, the WMS 104-2, and the WMS 104-3, initially, each of the WMS 104-1, the WMS 104-2, and the WMS 104-3 may determine a respective content-reception state of each of the WMS 104-1, the WMS 104-2, and the WMS 104-3. The respective content-reception state may be determined based on the position data. In an embodiment, the respective content-reception state determined for each of the WMS 104-1, the WMS 104-2, and the WMS 104-3 may be a positive content-reception state or a negative content-reception state. The positive content-reception state may include an on-ground content synchronization state (i.e., aircraft is on-ground, content synchronization is ON as well as media service access is ON) or an on-fly content synchronization state (i.e., aircraft is in air (say, at an altitude of about 10,500 feet and above), content synchronization is ON as well as media service access is ON). Similarly, the negative content-reception state may include a stand-by state (i.e., aircraft is in air while taking-off or landing (say, about 10,500 feet and below), content synchronization is OFF as well as media service access is OFF) or an on-fly media service access only state (i.e., aircraft is in air (say, about 10,500 feet and above), content synchronization is OFF but media service access is ON).

Upon determining the positive content-reception state of each of the WMS 104-1, the WMS 104-2, and the WMS 104-3, a respective content-reception suitability score may be determined by each of the WMS 104-1, the WMS 104-2, and the WMS 104-3. In an embodiment, the respective content-reception suitability score may be determined using a first trained Machine Learning (ML) model. Moreover, the respective content-reception suitability score may be determined based on a set of network parameters conducive for a synchronization of the media content between the CCDN and the plurality of in-flight WMSs. The set of network parameters may correspond to at least one of a connection stability, a bandwidth availability, a link quality, a connection throughput, a packet failure rate, or historical network performance parameters recorded for each air-route.

Once the respective content-reception suitability score is determined, then one or more elevated in-flight WMSs may be identified from each of the WMS 104-1, the WMS 104-2, and the WMS 104-3 based on the respective content-reception suitability score. In an embodiment, the one or more elevated in-flight WMSs may correspond to a WMS that has best content-reception suitability score among each of the plurality of in-flight WMSs. For example, the one or more elevated in-flight WMSs with best content-reception suitability score may be most suitable in-flight WMSs with good connection stability, bandwidth availability, link quality, and the like. As depicted via the present FIG. 4B, in an exemplary embodiment, the one or more elevated in-flight WMSs may correspond to the WMS 104-3.

In addition to identification of an elevated in-flight WMS, i.e., the WMS 104-3, each of the plurality of in-flight WMSs, i.e., the WMS 104-1, the WMS 104-2, and the WMS 104-3 may identify a suitable CCDN server among a set of CCDN servers in the CCDN 102. As depicted via the FIG. 1B, the set of CCDN servers in the CCDN 102 may include two CCDN servers, i.e., the CCDN server 102-1 and the CCDN server 102-2. In an embodiment, the suitable CCDN server may be identified for initiating transfer of the media content to the WMS 104-3. Further, in order to identify the suitable CCDN server, at least one of the WMS 104-1, the WMS 104-2, and the WMS 104-3 may determine a CCDN suitability score for each of the two CCDN servers using a second trained Machine Learning (ML) model.

The CCDN suitability score may be determined based on the set of network parameters and the position data of the aircraft. The set of network parameters may correspond to at least one of a connection stability, a bandwidth availability, a link quality, a connection throughput, a packet failure rate, or historical network performance parameters recorded for each air-route. Once the CCDN suitability score for each of the two CCDN servers is determined, the at least one of the WMS 104-1, the WMS 104-2, and the WMS 104-3 may be identified as the suitable CCDN server. The at least one of the WMS 104-1, the WMS 104-2, and the WMS 104-3 may be identified as the suitable CCDN server based on the CCDN suitability score of each of the set of CCDN servers. As depicted via the FIG. 1B, in an exemplary embodiment, the suitable CCDN server may correspond to the CCDN server 102-2. By way of an example, when the aircraft is travelling on air-route from Delhi to Mumbai, the suitable CCDN server may correspond to a CCDN server based in Delhi when the aircraft is about to take-off from Delhi, a CCDN server based in Mumbai when the aircraft has landed in Mumbai, or a CCDN server in Jaipur or Vadodra when the aircraft is cruising over Jaipur or Vadodra respectively.

Upon determining the elevated in-flight WMS, i.e., WMS 104-3 and the suitable CCDN server, i.e., the CCDN server 102-2, the wireless communication may be established between the WMS 104-3 and the CCDN server 102-2 via the communication network 106. Once the wireless communication is established, the WMS 104-3 may receive the media content from the CCDN server 102-2. In order to receive the media content by the WMS 104-3, initially, the WMS 104-3 may receive a list of media content from the CCDN server 102-2. In an embodiment, the list of media content may be generated by each of the WMS 104-1, the WMS 104-2, and the WMS 104-3 using a third trained ML model. Moreover, the list of media content may be generated based on historical data recorded for each air-route and an availability of a plurality of media content on each of the set of CCDN servers, i.e., the CCDN server 102-1 and CCDN server 102-2.

By way of an example, if a majority of passengers travelling on Delhi-Mumbai air-route were historically (say in past 3 months) interested in watching popular crime based web-series (e.g., Delhi Crime, Mirzapur, etc.), news feeds updates, latest Bollywood updates, then based on this historical data, the list of media content may be generated for an aircraft that is travelling on air-route from Delhi to Mumbai. Additionally, in order to generate the list of media content, the media content related to popular crime-based web-series, news feeds updates, and latest Bollywood updates must be available on the CCDN server 102-1 and the CCDN server 102-2 present in the CCDN 102.

Once the generated list of media content is received by the WMS 104-3, a user of the WMS 104-3 may select one or more media content from the list of media content. Further, based on the user selection of the media content from the list of media content, the selected media content may be received by the WMS 104-3. In other words, the selected media content may be downloaded in the WMS 104-3. Once the WMS 104-3 receives the selected media content, the WMS 104-3 may transfer the received media content to one or more of the remaining in-flight WMSs, i.e., the WMS 104-1 and the WMS 104-2 over the in-flight network. For example, in one scenario, the WMS 104-3 may itself broadcast and transfer the received media content to the WMS 104-1 and the WMS 104-2. In another scenario, the WMS 104-3 may receive a request for the received media content from the WMS 104-2 (in response to the broadcasting) and then transfer the received media content to the WMS 104-2. Alternatively, once the generated list of media content is received by the WMS 104-3, the WMS 104-3 may broadcast the list to other WMSs for selection by their users (e.g., for selection by users of the WMS 104-1 and WMS-2). All the users may respectively select one or more desired media content from the list of media content. The selection may be received by WMS 104-3, which may then request the one or more desired media content from the suitable CCDN server. Thus, based on the user selection of the one or more desired media content from the list of media content, the selected media content may be received by the WMS 104-3. Once the WMS 104-3 receives the selected media content, the WMS 104-3 may transfer the requested media content to the respective WMSs for consumption by their users. For example, in one scenario, the WMS 104-3 user wants to watch "Delhi Crime" while WMS 104-1 user wants to hear "Indie Pop" and WMS 104-2 user wants to read latest edition of "Economic Times", then WMS 104-3 will request the suitable CCDN server for these content and then render "Delhi Crime" at WMS 104-3 and distribute "Indie Pop" album to WMS 104-1 and the latest edition of "Economic Times" to WMS 104-2.

Figure 2:
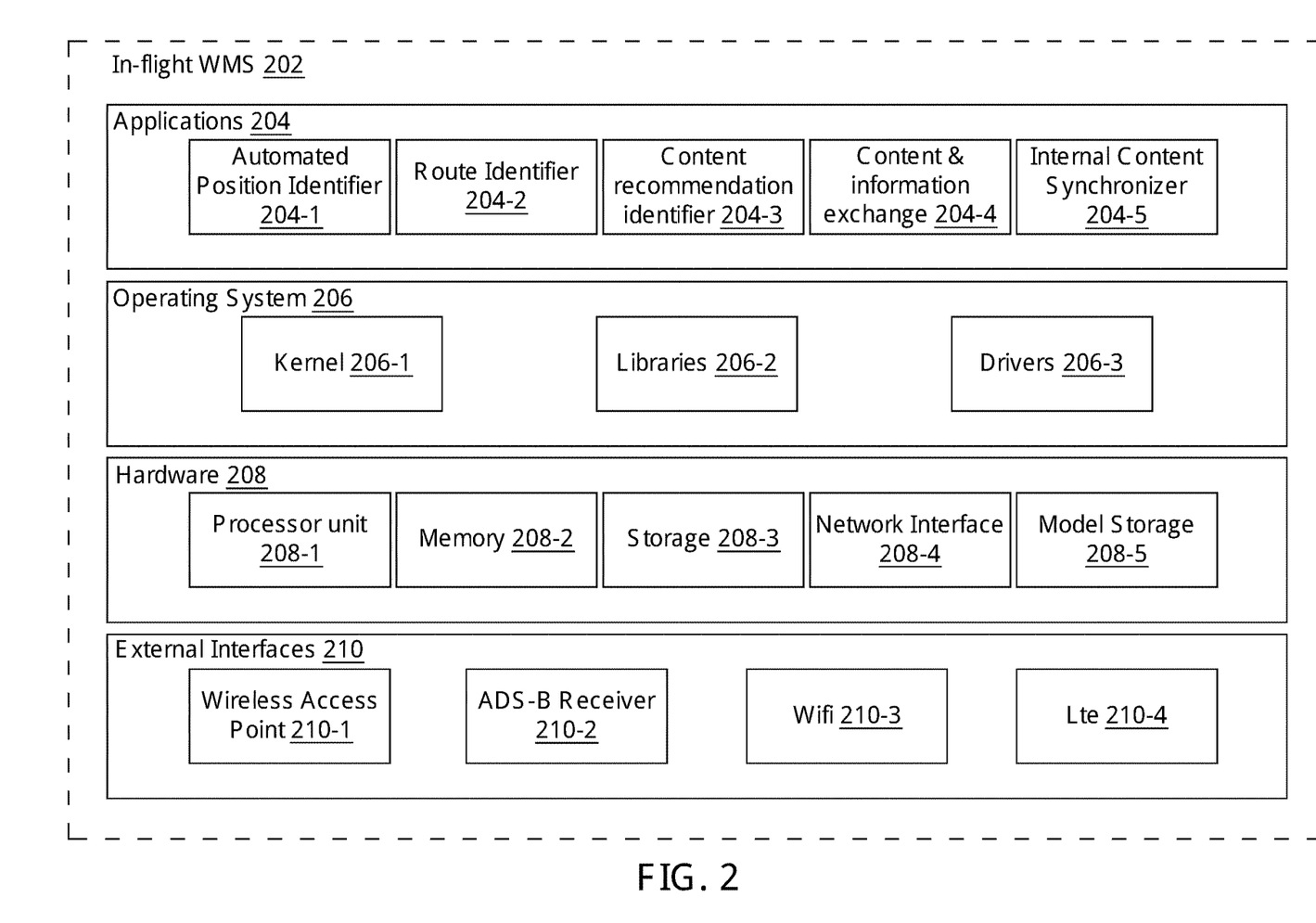
FIG. 2 illustrates a functional diagram of various components of an in-flight WMS, in accordance with some embodiment.

Referring now to FIG. 2, a functional diagram of various components of an in-flight WMS 202 is illustrated, in accordance with some embodiment. In reference to FIG. 1, the in-flight WMS 202 may correspond to one of the WMS 104-1, the WMS 104-2, or the WMS 104-3. The in-flight WMS 202 may include an application 204, an operating system 206, a hardware 208, and an external interface 210.

The application 204 may correspond to an application software that is installed in the electronic device, i.e., the WMS 202 (for example: smartphone, tablet computers, laptops, etc.) of the user. The application 204 may be configured to perform various action to perform transmission of the media content from the CCND to the WMS 202. In order to perform transmission of the media content, the application 204 may include various modules, such as, an automated position identifier module 204-1, a route identifier module 204-2, a content recommendation identifier module 204-3, a content and information exchange module 204-4, and an internal content synchronizer module 204-5.

The automated position identifier module 204-1 may be configured to identify position data of the aircraft. In order to identify the position data of the aircraft, the automated position identifier module 204-1 may need to identify the movement, the altitude, and/or the geo-spatial location of the aircraft. In order to identify the position data of the aircraft, the automated position identifier module 204-1 may include or may communicate with the set of primary sensors and/or the set of secondary sensors. In an embodiment, the set of primary sensors may correspond to the ADS-B sensors, while the set of secondary sensors may correspond to Accelerometer, Gyroscope, Altimeter or Pressure sensor, and location sensor.

The route identifier module 204-2 may be configured to identify and establish end-to-end route between the chosen CCDN server (e.g., CCDN server 102-2, communication network (e.g., communication network 106 and chosen elevated WMS server (e.g., WMS 104-3) for receiving the media content from the suitable CCDN server. This end-to-end route details are persisted for re-establishing the route in future, if again the same CCDN server and WMS are selected.

The content recommendation identifier module 204-3 may be configured to monitor the media content accessed by the user of the WMS 202 while travelling. The content recommendation identifier module 204-3 may monitor the media content accessed by the user for different air-routes travelled by the user in the past. The information related to the access of the media content by the user during different air-routes may be stored as the historical data. Further, the content recommendation identifier module 204-3 may be configured to use this historical data to generate the list of media content for the user based on the travelling air-route of the user. It should be noted that, the historical data may be recorded for each user. In addition, the list of media content may be generated based on the historical data recorded for each user travelling in the aircraft. In order to generate the list of media content, the content recommendation identifier module 204-3 may include the third trained ML model. By way of an example, the list of media content may include, but is not limited to, media content specific to language, artists, region, latest contents, e.g., new episodes, new web series, and latest magazines. Further, the third trained ML model may be iteratively trained based on the media content accessed by the users while travelling in different air-routes.

The content and information exchange module 204-4 may be configured to establish the wireless communication between the WMS 202 and the CCDN server (same as the CCDN server 102-2) for transmitting the media content. In order to perform transmission of the media content, the content and information exchange module 204-4 may be configured to receive the list of media content from the CCDN server. Further, the content and information exchange module 204-4 may be configured to transfer the user selection of the media content to the CCDN server. In addition, the content and information exchange module 204-4 may be configured to receive the media content selected from the list of media content from the suitable CCDN server.

The internal content synchronizer module 204-5 may be configured for transferring the media content to one or more of the remaining in-flight WMSs over the in-flight network. The synchronization to the rest of the WMSs happens during the appropriate on-ground or on-fly state (i.e., when media service access is ON). The delta of the new content available to that of available content is synchronized with the rest of WMS.

The operating system 206 may be configured to manage all applications including the application 204 running on the WMS 202 (i.e., the electronic device of the user). Examples of the operating system 206 may include, but is not limited to, Apple macOS, Microsoft Windows, Google's Android OS, Linux Operating System, and Apple iOS. As already known, the operating system 206 includes a kernel 206-1, libraries 206-2, and drivers 206-3.

The hardware 208 may include a processor unit 208-1, a memory 208-2, a storage 208-3, a network interface 208-4, and model storage 208-5. The memory 208-2 may store instructions that, when executed by the processor unit 208-1, may cause the processor unit 208-1 to perform transmission of the media content from the CCDN to the plurality of in-flight WMSs, in accordance with some embodiments. In an embodiment, for performing transmission of the media content, the processor unit 208-1 may include an edge computing processor. The memory 208-2 may also store various data (e.g., the position data of the aircraft, the respective content-reception state, the respective content-reception suitability score, etc.,) that may be captured, processed, and/or required by the performance evaluation device 102. The memory 208-2 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random-Access Memory (DRAM), Static Random-Access memory (SRAM), etc.). Further, the storage 208-3 may be configured to store the received media content. The network interface 208-4 may enable interconnection of the WMS 202 with the in-flight network or the communication network. The model storage 208-5 may correspond to an internal storage available in the WMS 202.

Further, the external interfaces 210 may include a WAP 210-1, an ADS-B receiver 210-2, a Wi-Fi 210-3, and LTE 210-4. The external interfaces 210 may be used to establish the wireless communication between the WMS 202 and the suitable CCDN server and the remaining in-flight WMSs.

Figure 3:
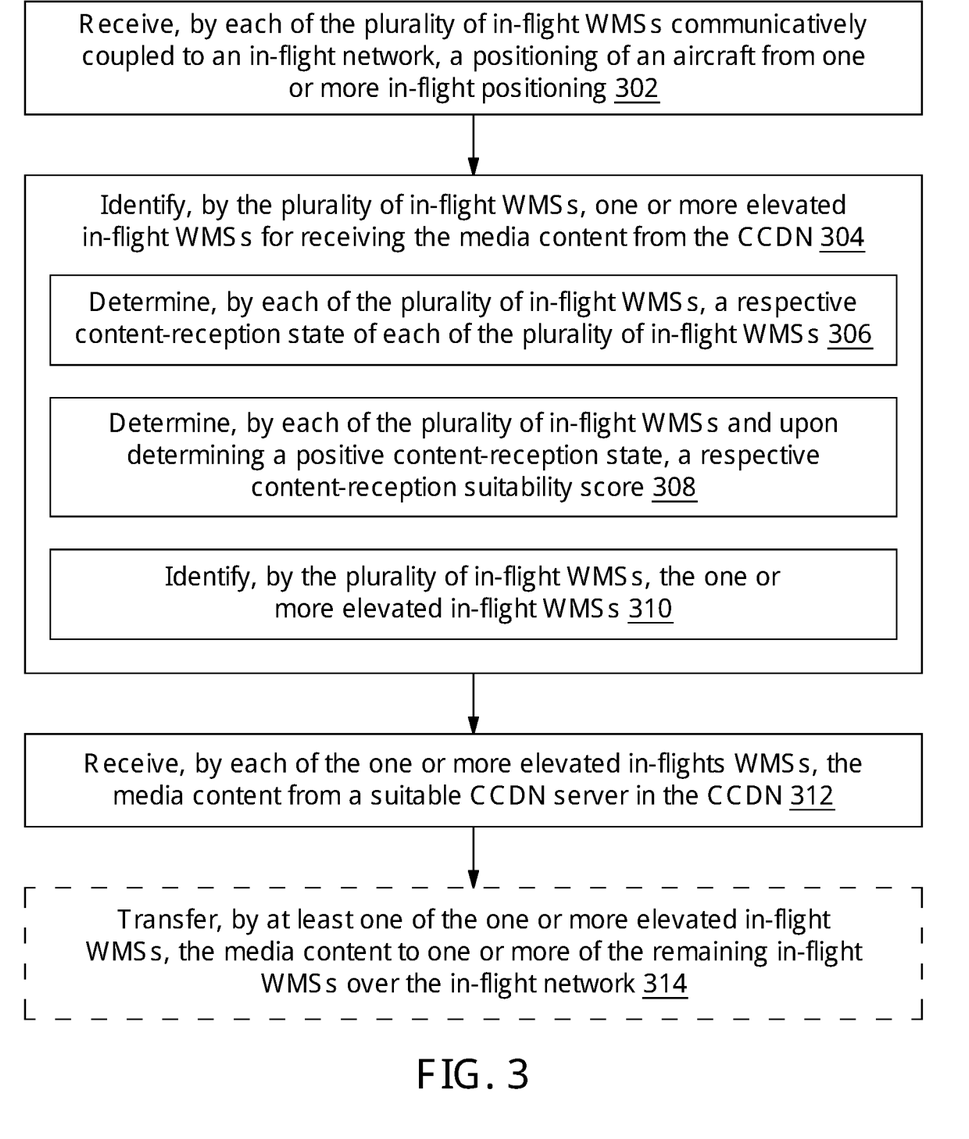
FIG. 3 illustrates a flowchart of a method for transmitting media content from a CCDN to a plurality of in-flight WMSs, in accordance with an embodiment.

Referring now to FIG. 3, a flowchart of a method for transmitting media content from a CCDN to a plurality of in-flight WMSs is illustrated, in accordance with an embodiment. Initially, at step 302, position data of an aircraft may be received by each of the plurality of in-flight WMSs coupled to an in-flight network. The position data may be received from one or more in-flight sensors. In an embodiment, the position data may include a movement, an altitude, and/or a geo-spatial location of the aircraft. In addition, the one or more of in-flight sensors may include a set of primary sensors and a set of secondary sensors. By way of an example, the set of primary sensors may correspond to ADS-B sensors, i.e., the ADS-B receivers. Further, the set of secondary sensors may include Accelerometer, Gyroscope, Altimeter or Pressure sensor, and/or location sensor. In an embodiment, each of the plurality of in-flight WMSs may correspond to an electronic device of an on-board passenger. Further, examples of the electronic device may include, but is not limited to, a smartphone, a laptop, and a tablet.

Upon receiving the position data of the aircraft by each of the plurality of in-flight WMSs, at step 304, the plurality of in-flight WMSs may identify one or more elevated in-flight WMSs. The one or more elevated in-flight WMSs may be identified in order to receive the media content from the CCDN. In order to identify one or more elevated in-flight WMSs, at step 306, each of the plurality of in-flight WMSs may determine a respective content-reception state of each of the plurality of in-flight WMSs. In an embodiment, the respective content-reception state may be determined based on the position data of the aircraft. In other words, the respective content-reception state may be determined based on the movement, the altitude, and/or the geo-spatial location of the aircraft.

As discussed above, the content-reception state of a WMS may be a positive content-reception state or a negative content-reception state. The positive content-reception state may include an on-ground content synchronization state or an on-fly content synchronization state. Similarly, the negative content-reception state may include a stand-by state or an on-fly media service access only state. By way of an example, during no/slow movement at terminal (i.e., source terminal), the WMS will be in the positive content-reception state, i.e., on-ground content synchronization state (content synchronization as well as media streaming is enabled). During take-off movement, until flight altitude reaches 10,500 feet (or any other pre-configured altitude), the WMS will be in the negative content-reception state, i.e., stand-by state (content synchronization as well as media streaming is disabled). During takeoff, when the flight altitude reaches above 10,500 feet (or any other pre-configured altitude), the WMS may be in the positive content-reception state, i.e., on-fly content synchronization state (content synchronization as well as media streaming is enabled). Alternatively, in such cases, the WMS may be in the negative content-reception state, i.e., on-fly media service access only state (content synchronization is disabled but media streaming is enabled). It should be noted that such on-fly media service access only state may occur on encountering certain circumstances (say, turbulent weather, no external network, in and around sensitive govt. installation, etc.), Further, during landing, when the flight altitude reaches 10,000 feet (or any other pre-configured altitude), the WMS may be in the negative content-reception state, i.e., stand-by state. After landing, when no/slow movement is detected at terminal (i.e., destination terminal), the WMS will be in the positive content-reception state, i.e., on-ground content synchronization state.

It should be noted that the content synchronization with the suitable CCDN server may be done using any suitable wireless network. For example, Wi-Fi or LTE may enable on-ground content synchronization or satellite internet access through low-earth orbit satellite (e.g., STARLINK) may enable on-fly content synchronization as and when network connectivity is available and established.

Once the respective content-reception state is determined for each of the plurality of in-flight WMSs, at step 308, each of the plurality of in-flight WMSs may determine a respective content-reception suitability score. In an embodiment, the respective content-reception suitability score may be determined after determining a positive content-reception state of each of the plurality of in-flight WMSs. Upon determining the positive content-reception state of each of the plurality of in-flight WMSs, the respective content-reception suitability score may be determined for each of the plurality of in-flight WMSs. In an embodiment, the respective content-reception suitability score may be determined using a first trained Machine Learning (ML) model. Moreover, the respective content-reception suitability score may be determined based on a set of network parameters conducive for a synchronization of the media content between the CCDN and the plurality of in-flight WMSs. In an embodiment, the set of network parameters may correspond to at least one of a connection stability, a bandwidth availability, a link quality, a connection throughput, a packet failure rate, or historical network performance parameters recorded for each air-route.

Further, at step 310, the plurality of in-flight WMSs may determine the one or more elevated in-flight WMSs. The one or more elevated in-flight WMSs may be determined based on the respective content-reception suitability score of each of the plurality of in-flight WMSs. In an embodiment, the one or more elevated in-flight WMSs may correspond to a WMS that has best content-reception suitability score of each of the plurality of in-flight WMSs. For example, the one or more elevated in-flight WMSs with best content-reception suitability score may be most suitable WMSs with good connection stability, bandwidth availability, link quality, and the like.

In addition to identification of the one or more elevated in-flight WMSs, the plurality of in-flight WMSs may identify a suitable CCDN server from the set of CCDN servers present in the CCDN for initiating transfer of the media content to the one or more elevated in-flight WMSs. In order to identify the suitable CCDN server, at least one of the plurality of in-flight WMSs may determine a CCDN suitability score for each of the set of CCDN servers. The CCDN suitability score for each of the set of CCDN servers may be determined using a second trained Machine Learning (ML) model. Moreover, the CCDN suitability score for each of the set of CCDN servers may be determined based on the set of network parameters and the position data of the aircraft. Upon determining the CCDN suitability score, the at least one of the plurality of in-flight WMSs may identify the suitable CCDN server based on the CCDN suitability score determined for each of the set of CCDN servers.

Once the one or more elevated in-flight WMSs and the suitable CCDN server are identified, then, at step 312, each of the one or more elevated in-flights WMSs may receive the media content from the suitable CCDN server in the CCDN. In an embodiment, the media content may be received by each of the one or more elevated in-flights WMSs after establishing a wireless connection between the one or more elevated in-flights WMSs and the suitable CCDN server. Further, in order to receive the media content, each of the one or more elevated in-flight WMSs may initially receive a list of media content from the suitable CCDN server. The list of media content may be generated by the plurality of in-flight WMSs using a third trained ML model. Moreover, the list of media content may be generated based on historical data recorded for each air-route and an availability of a plurality of media content on each of a set of CCDN servers. Upon receiving the list of media content, each of the one or more elevated in-flight WMSs may receive from a user a selection of the media content from the list. Further, upon receiving the media content, by each of the one or more elevated in-flight WMSs, at least one of the one or more elevated in-flight WMSs may transfer the media content to one or more of the remaining in-flight WMSs over the in-flight network. The method explained in FIG. 3 of transmission of the media content from the CCDN to the plurality of in-flight WMSs is further explained in detail in conjunction with FIG. 4A-4B.

Referring now to FIG. 4A-4B, a detailed flowchart of a method for transmitting media content from a CCDN to a plurality of in-flight WMSs is illustrated, in accordance with an embodiment. FIG. 4B is a continuation of FIG. 4A. Initially, at step 402, the position data of the aircraft may be determined. In order to determine the position data of the aircraft, the movement, the altitude, and/or the geo-spatial location of the aircraft may be determined using the one or more in-flight sensors. The one or more in-flight sensors may include the set of primary sensors and the set of secondary sensors. By way of an example, the one or more in-flight sensors may be the ADS-B sensors. For example, in reference to FIG. 1B, in order to determine the position data of the aircraft, the ADS-B receiver of the WMS 104-3 may receive positioning signals generated by the ADS-B transmitter onboard on the aircraft. The positioning signals received via the ADS-B receiver may be processed by the WMS 104-3 to determine the position data of the aircraft.

Once the position data of the aircraft is determined, at step 404, a check may be performed to determine whether the aircraft is in on-ground position, taking-off, cruising, landing, and so forth. Based on the check performed and upon identifying the on-ground position or on-fly position (cruising at about 10,000 feet and above), the plurality of in-flight WMSs may identify one or more elevated in-flight WMSs. The one or more elevated in-flight WMSs may be identified in order to receive the media content from the CCDN. Further, in order to identify one or more elevated in-flight WMSs, each of the plurality of in-flight WMSs may determine, at step 406, the respective content-reception state of each of the plurality of in-flight WMSs. The respective content-reception state of each of the plurality of in-flight WMSs may be determined based on the position data of the aircraft. In an embodiment, the determination of the respective content-reception state of each of the plurality of in-flight WMSs is performed to ensure each of the plurality of in-flight WMSs is in the positive content-reception state. In an embodiment, the positive content-reception state may include the on-ground content synchronization state or the on-fly content synchronization state, and the negative content-reception state may include the on-fly media service access only state and the stand-by state.

Once the positive content-reception state is determined for each of the plurality of in-flight WMSs, at step 408, a network link quality, i.e., the respective content-reception suitability score may be determined for each of the plurality of in-flight WMSs. In an embodiment, the respective content-reception suitability score may be determined using the first trained ML model. Moreover, the respective content-reception suitability score may be determined based on the set of network parameters conducive for a synchronization of the media content between the CCDN and the plurality of in-flight WMSs. The set of network parameters may correspond to at least one of a connection stability, a bandwidth availability, a link quality, a connection throughput, a packet failure rate, or historical network performance parameters recorded for each air-route.

In one embodiment, after determining the respective content-reception suitability score, at step 410, the one or more elevated in-flight WMSs based on the respective content-reception suitability score of each of the plurality of in-flight WMSs. In other words, the one or more elevated in-flight WMSs may be identified as gateway to receive the media content. Further, as mentioned via the step 412, the first ML model may be iteratively trained to determine the respective content-reception suitability score based on the set of network parameters collected for each of the plurality of in-flight WMSs. In order to iteratively train the first trained ML model, as mentioned via step 414, the collection of the set of network parameters may be periodically performed for each of the plurality of in-flight WMSs.

In another embodiment, after determining the respective content-reception suitability score for each of the plurality of in-flight WMSs, at step 416, the suitable CCDN server may be identified form the set of CCDN servers present in the CCDN. In an embodiment, the suitable CCDN server may be identified by the one or more elevated in-flight WMSs. In order to identify the suitable CCDN server, the CCDN suitability score may be determined for each of the set of CCDN servers using the second trained ML model. Moreover, the CCDN suitability score for each of the set of CCDN servers may be determined based on the set of network parameters and the position data of the aircraft. Based on the CCDN suitability score determined for each of the set of CCDN servers, the suitable CCDN server may be identified. Further, as mentioned via the set 418, the second trained ML model may be iteratively retrained based on the set of network parameters collected for each of the set of CCDN servers for identifying the suitable CCDN server. In order to iteratively train the second trained ML model, as mentioned via step 420, the collection of the set of network parameters may be periodically performed for each of the set of CCDN servers. In other words, the set of network parameters for each of the set of CCDN servers may be collected during previous transmission of the media content performed by each of the set of CCDN servers.

Once the one or more elevated in-flight WMSs and the suitable CCDN server is identified, then at step 422, the wireless communication may be established between the one or more elevated in-flight WMSs and the suitable CCDN server. In an embodiment, the wireless communication may be established using a communication network (same as the communication network 106), for example: Wi-Fi and LTE. Upon establishing the wireless communication, the one or more elevated in-flight WMSs may receive the media content from the suitable CCDN server. In order to receive the media content, initially, at step 424, each of the plurality of in-flight WMSs may generate the list of media content using the third trained ML model. Moreover, the list of media content may be generated based on the historical data recorded for each air-route and the availability of the plurality of media content on each of the set of CCDN servers. Further, as mentioned via step 426, the third trained ML model may be iteratively trained based on the historical data collected for each air-route. In an embodiment, the historical data collected may correspond to data including media content usage by each of the plurality of in-flight WMSs during each air-route. Further, in order to iteratively train the third trained ML model, as mentioned via step 428, usage of the media content by each of the plurality of in-flight WMSs may be collected for each air-route.

Once the list of media content is generated, the generated list of media content may be received by each of the one or more elevated in-flight WMSs from the suitable CCDN server. Upon receiving the list of media content, the user may select the media content from the list of media content. Upon selecting the media content from the list, at step 430, synchronization of the media content from the suitable CCDN server to the one or more elevated in-flight WMSs may be started. In other words, once the media content is selected, the selected media content may start downloading in the one or more elevated in-flight WMSs from the suitable CCDN server. Once the synchronization of the media content starts, then, at step 432, a check may be performed to identify whether the synchronization of the media content from the suitable CCDN server to the one or more elevated in-flight WMSs is complete. In other words, a check may be performed to identify whether the selected media content is completely downloaded in the one or more elevated in-flight WMSs from the suitable CCDN server.

In one embodiment, based on the check performed, when the synchronization of the media content is identified to be complete, as mentioned via step 434, then at step 436, the media content received by the one or more elevated in-flight WMSs may be transferred by at least one of the one or more elevated in-flight WMSs to one or more of the remaining in-flight WMSs over the in-flight network. In another embodiment, based on the check performed, when the synchronization of the media content is identified as not complete, then at step 438, a check may be performed to determine whether the aircraft is in the content-reception state (say, the on-ground position). By way of an example, if the synchronization of the media content stops due to some issue (for example: network issue, change in the positive content-reception state, or the like), then the check may be performed to identify a reason for the issue.

In one embodiment, based on the check performed, when the aircraft is determined to be in the on-ground position (i.e., the one or more elevated in-flight WMSs are in the positive content-reception state), then process from step 430 is re-executed and the synchronization of the media content from the suitable CCDN server to the one or more elevated in-flight WMSs may restart. Further, in another embodiment, based on the check performed, when the aircraft is determined not to be in the on-ground position (i.e., the one or more elevated in-flight WMSs are in the negative content-reception state), then at step 440, the synchronization of the media content may be paused. In an embodiment, the synchronization of the media content may be paused until re-identification of the on-ground position of the aircraft, i.e., the positive content-reception state. Further, in order to restart the synchronization of the media content after pausing as mentioned via the step 440, the process from step 408 may be re-executed.

Various embodiments provide method and system for transmitting media content from a cloud content delivery network (CCDN) to a plurality of in-flight wireless media servers (WMSs). The disclosed method and system may receive, by each of the plurality of in-flight WMSs communicatively coupled to an in-flight network, a positioning of an aircraft from one or more in-flight positioning sensors. Further, the disclosed method and system may identify, by the plurality of in-flight WMSs, one or more elevated in-flight WMSs for receiving the media content from the CCDN. Moreover, identification of one or more elevated in-flight WMSs may include determination, by each of the plurality of in-flight WMSs, a respective content-reception state of each of the plurality of in-flight WMSs based on the position data of the aircraft. In addition, identification of one or more elevated in-flight WMSs may further include determination, by each of the plurality of in-flight WMSs and upon determining a positive content-reception state, a respective content-reception suitability score, using a first trained Machine Learning (ML) model, based on a set of network parameters conducive for a synchronization of the media content between the CCDN and the plurality of in-flight WMSs. Further, the identification of one or more elevated in-flight WMSs may include identification, by the plurality of in-flight WMSs, the one or more elevated in-flight WMSs based on the respective content-reception suitability score of each of the plurality of in-flight WMSs. Thereafter, the disclosed method and system may receive, by each of the one or more elevated in-flights WMSs, the media content from a suitable CCDN server in the CCDN upon establishing a wireless communication between the one or more elevated in-flights WMSs and the suitable CCDN server.

The disclosed method and system may provide some advantages like, the disclosed method and the system may provide efficient media content synchronization to in-flight WMSs from a cloud content delivery system (CCDN) during flight (aircraft) transits in limited available time. This is done by automating media content synchronization from the CCDN to the in-flight WMSs, thereby accelerating media content synchronization considering network parameters and time limit available for content synchronization. Further, the disclosed method and system may enable identification of relevant media content (i.e., the list of media content) for the in-flight WMSs based on media content usage by each of the in-flight WMSs using a trained ML model (i.e., the third ML model) for providing enhanced viewership of relevant media content to passengers on-board.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method of transmitting media content from a cloud content delivery network (CCDN) to a plurality of in-flight wireless media servers (WMSs), the method comprising:
   receiving, by each of the plurality of in-flight WMSs communicatively coupled to an in-flight network, position data with respect to at least one of a movement, an altitude, or a geo-spatial location of an aircraft from one or more in-flight sensors;
   identifying, by the plurality of in-flight WMSs, one or more elevated in-flight WMSs for receiving the media content from the CCDN, wherein identifying comprises:
      determining, by each of the plurality of in-flight WMSs, a respective content-reception state of each of the plurality of in-flight WMSs based on the position data;
      determining, by each of the plurality of in-flight WMSs and upon determining a positive content-reception state, a respective content-reception suitability score, using a first trained Machine Learning (ML) model, based on a set of network parameters conducive for a synchronization of the media content between the CCDN and the plurality of in-flight WMSs; and
      identifying, by the plurality of in-flight WMSs, the one or more elevated in-flight WMSs based on the respective content-reception suitability score of each of the plurality of in-flight WMSs; and
   receiving, by each of the one or more elevated in-flights WMSs, the media content from a suitable CCDN server in the CCDN upon establishing a wireless communication between the one or more elevated in-flights WMSs and the suitable CCDN server.

2. The method of claim 1, further comprising:
   transferring, by at least one of the one or more elevated in-flight WMSs, the media content to one or more of the remaining in-flight WMSs over the in-flight network.

3. The method of claim 1, the set of network parameters corresponds to at least one of a connection stability, a bandwidth availability, a link quality, a connection throughput, a packet failure rate, or historical network performance parameters recorded for each air-route.

4. The method of claim 1, wherein receiving the media content from the suitable CCDN server comprises:
   receiving, by each of the one or more elevated in-flight WMSs, a list of media content from the suitable CCDN server; and
   receiving, by each of the one or more elevated in-flight WMSs and from a user, a selection of the media content from the list.

5. The method of claim 4, wherein the list of media content is generated, by the plurality of in-flight WMSs, using a third trained ML model based on historical data recorded for each air-route and an availability of a plurality of media content on each of the set of CCDN servers.

6. The method of claim 1, further comprising:
   identifying, by the plurality of in-flight WMSs, the suitable CCDN server, from among a set of CCDN servers in the CCDN, for initiating transfer of the media content to the one or more elevated in-flight WMSs, wherein identifying comprises:
      determining, by at least one of the plurality of in-flight WMSs, a CCDN suitability score for each of the set of CCDN servers using a second trained Machine Learning (ML) model, based on the set of network parameters and the position data; and
      identifying, by the at least one of the plurality of in-flight WMSs, the suitable CCDN server based on the CCDN suitability score of each of the set of CCDN servers.

7. The method of claim 1, wherein receiving the position data from the one or more in-flight sensors comprises receiving the at least one of the movement, the altitude, or the geo-spatial location of the aircraft from at least one of a set of primary sensors or a set of secondary sensors.

8. The method of claim 1, wherein the positive content-reception state comprises an on-ground content synchronization state or an on-fly content synchronization state, and wherein a negative content-reception state comprises a stand-by state or an on-fly media service access only state.

9. A system for transmitting media content from a cloud content delivery network (CCDN) to a plurality of in-flight wireless media servers (WMSs), the system comprising:
   a processor; and a memory coupled to the processor, wherein the memory stores processor executable instructions, which, on execution, causes the processor to:
receiving, by each of the plurality of in-flight WMSs communicatively coupled to an in-flight network, position data with respect to at least one of a movement, an altitude, or a geo-spatial location of an aircraft from one or more in-flight sensors;
identify, by the plurality of in-flight WMSs, one or more elevated in-flight WMSs for receiving the media content from the CCDN, wherein identifying comprises:
determine, by each of the plurality of in-flight WMSs, a respective content-reception state of each of the plurality of in-flight WMSs based on the position data;
determine, by each of the plurality of in-flight WMSs and upon determining a positive content-reception state, a respective content-reception suitability score, using a first trained Machine Learning (ML) model, based on a set of network parameters conducive for a synchronization of the media content between the CCDN and the plurality of in-flight WMSs; and
identify, by the plurality of in-flight WMSs, the one or more elevated in-flight WMSs based on the respective content-reception suitability score of each of the plurality of in-flight WMSs; and
receive, by each of the one or more elevated in-flights WMSs, the media content from a suitable CCDN server in the CCDN upon establishing a wireless communication between the one or more elevated in-flights WMSs and the suitable CCDN server.

10. The system of claim 9, wherein the processor executable instructions further cause the processor to:
transfer, by at least one of the one or more elevated in-flight WMSs, the media content to one or more of the remaining in-flight WMSs over the in-flight network.

11. The system of claim 9, the set of network parameters corresponds to at least one of a connection stability, a bandwidth availability, a link quality, a connection throughput, a packet failure rate, or historical network performance parameters recorded for each air-route.

12. The system of claim 9, wherein, to receive the media content from the suitable CCDN server, the processor executable instructions further cause the processor to:
receive, by each of the one or more elevated in-flight WMSs, a list of media content from the suitable CCDN server; and
receive, by each of the one or more elevated in-flight WMSs and from a user, a selection of the media content from the list.

13. The system of claim 12, wherein the list of media content is generated, by the plurality of in-flight WMSs, using a third trained ML model based on historical data recorded for each air-route and an availability of a plurality of media content on each of the set of CCDN servers.

14. The system of claim 9, wherein the processor executable instructions further cause the processor to:
identifying, by the plurality of in-flight WMSs, the suitable CCDN server, from among a set of CCDN servers in the CCDN, for initiating transfer of the media content to the one or more elevated in-flight WMSs, wherein identifying comprises:
determining, by at least one of the plurality of in-flight WMSs, a CCDN suitability score for each of the set of CCDN servers using a second trained Machine Learning (ML) model, based on the set of network parameters and the position data; and
identifying, by the at least one of the plurality of in-flight WMSs, the suitable CCDN server based on the CCDN suitability score of each of the set of CCDN servers.

15. The system of claim 9, wherein, to receive the position data from the one or more in-flight sensors, the processor executable instructions further cause the processor to receive the at least one of the movement, the altitude, or the geo-spatial location of the aircraft from at least one of a set of primary sensors or a set of secondary sensors.

16. The system of claim 9, wherein the positive content-reception state comprises an on-ground content synchronization state and an on-fly content synchronization state, and wherein a negative content-reception state comprises a stand-by state or an on-fly media service access only state.

17. A non-transitory computer-readable medium storing computer-executable instructions for transmitting media content from a cloud content delivery network (CCDN) to a plurality of in-flight wireless media servers (WMSs), the stored instructions, when executed by a processor, cause the processor to perform operations comprises:
receiving, by each of the plurality of in-flight WMSs communicatively coupled to an in-flight network, position data with respect to at least one of a movement, an altitude, or a geo-spatial location of an aircraft from one or more in-flight sensors;
identifying, by the plurality of in-flight WMSs, one or more elevated in-flight WMSs for receiving the media content from the CCDN, wherein identifying comprises:
determining, by each of the plurality of in-flight WMSs, a respective content-reception state of each of the plurality of in-flight WMSs based on the position data;
determining, by each of the plurality of in-flight WMSs and upon determining a positive content-reception state, a respective content-reception suitability score, using a first trained Machine Learning (ML) model, based on a set of network parameters conducive for a synchronization of the media content between the CCDN and the plurality of in-flight WMSs; and
identifying, by the plurality of in-flight WMSs, the one or more elevated in-flight WMSs based on the respective content-reception suitability score of each of the plurality of in-flight WMSs; and
receiving, by each of the one or more elevated in-flights WMSs, the media content from a suitable CCDN server in the CCDN upon establishing a wireless communication between the one or more elevated in-flights WMSs and the suitable CCDN server.

18. The non-transitory computer-readable medium of claim 17, wherein the stored instructions, when executed by the processor, further cause the processor to perform operations comprising:
transferring, by at least one of the one or more elevated in-flight WMSs, the media content to one or more of the remaining in-flight WMSs over the in-flight network.

19. The non-transitory computer-readable medium of claim 17, wherein the stored instructions, when executed by the processor, further cause the processor to perform operations comprising:
identifying, by the plurality of in-flight WMSs, the suitable CCDN server, from among a set of CCDN servers in the CCDN, for initiating transfer of the media content to the one or more elevated in-flight WMSs, wherein identifying comprises:
  determining, by at least one of the plurality of in-flight WMSs, a CCDN suitability score for each of the set of CCDN servers using a second trained Machine Learning (ML) model, based on the set of network parameters and the position data; and
  identifying, by the at least one of the plurality of in-flight WMSs, the suitable CCDN server based on the CCDN suitability score of each of the set of CCDN servers.

20. The non-transitory computer-readable medium of claim 17, wherein the positive content-reception state comprises an on-ground content synchronization state or an on-fly content synchronization state, and wherein a negative content-reception state comprises a stand-by state or an on-fly media service access only state.

\* \* \* \* \*